(12) United States Patent
Hoehne et al.

(10) Patent No.: US 10,480,441 B2
(45) Date of Patent: Nov. 19, 2019

(54) SYSTEM AND METHOD FOR CONTROLLING EXHAUST GAS TEMPERATURE

(71) Applicant: Cummins Inc., Columbus, IN (US)

(72) Inventors: John L. Hoehne, Columbus, IN (US); Ian W. McGiffen, Scipio, IN (US); Chandan Mahato, Columbus, IN (US); Paul Daniel Borisuk, Nashville, IN (US); Boopathi Singalandapuram Mahadevan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 164 days.

(21) Appl. No.: 15/873,972

(22) Filed: Jan. 18, 2018

(65) Prior Publication Data
US 2018/0149105 A1 May 31, 2018

Related U.S. Application Data

(63) Continuation of application No. PCT/US2015/041576, filed on Jul. 22, 2015.

(51) Int. Cl.
*F02D 41/00* (2006.01)
*F02D 41/14* (2006.01)
(Continued)

(52) U.S. Cl.
CPC ....... *F02D 41/1446* (2013.01); *F01N 3/2066* (2013.01); *F01N 11/002* (2013.01);
(Continued)

(58) Field of Classification Search
CPC ............. F02D 41/1446; F02D 41/0245; F02D 2041/0265; F01N 3/2066; F01N 11/002
See application file for complete search history.

(56) References Cited

U.S. PATENT DOCUMENTS 3,978,718 A * 9/1976 Schorsch ................ G01L 3/242
73/116.05
4,368,705 A 1/1983 Stevenson et al.
(Continued)

FOREIGN PATENT DOCUMENTS

WO 2015054657 4/2015
WO WO-2015054657 A1 * 4/2015 ......... F02D 19/0647

OTHER PUBLICATIONS

International Search Report and Written Opinion, PCT Appln. No. PCT/US15/41576, Cummins Inc. dated Oct. 23, 2015.

*Primary Examiner* — Thomas N Moulis
(74) *Attorney, Agent, or Firm* — Taft Stettinius & Hollister LLP

(57) ABSTRACT

A system and method for controlling a temperature of an exhaust gas at an inlet of a selective catalytic reduction system during at least certain low air density conditions. The system may detect an air density value upstream of an internal combustion engine of an engine system, such as, for example, at an inlet of a compressor. Using the detected air density, one of a plurality of relationships between an engine speed and an outputted engine power, as a function of the detected air density value, may be selected for use in determining what combination of engine speed(s) and/or engine power(s) will produce an exhaust gas that is within a target exhaust gas temperature. Using the selected relationship, at least one of the engine speed and the engine power may be adjusted to at least assist in attaining the target exhaust gas temperature.

20 Claims, 7 Drawing Sheets

(51) Int. Cl.
  *F02B 29/04*    (2006.01)
  *F02M 26/05*    (2016.01)
  *F02D 41/02*    (2006.01)
  *F01N 3/20*     (2006.01)
  *F01N 11/00*    (2006.01)
  *F02B 37/18*    (2006.01)
  *F02B 37/00*    (2006.01)

(52) U.S. Cl.
  CPC ........ *F02B 29/0406* (2013.01); *F02B 37/186* (2013.01); *F02D 41/0007* (2013.01); *F02D 41/0245* (2013.01); *F02M 26/05* (2016.02); *F01N 2430/00* (2013.01); *F01N 2900/1404* (2013.01); *F01N 2900/1406* (2013.01); *F01N 2900/1602* (2013.01); *F02B 37/00* (2013.01); *F02D 2200/0406* (2013.01); *F02D 2200/0802* (2013.01); *F02D 2250/36* (2013.01); *Y02T 10/144* (2013.01); *Y02T 10/146* (2013.01); *Y02T 10/24* (2013.01); *Y02T 10/26* (2013.01); *Y02T 10/47* (2013.01)

(56) References Cited

U.S. PATENT DOCUMENTS

| | | | | |
|---|---|---|---|---|
| 4,493,303 | A * | 1/1985 | Thompson | F02D 41/04 123/352 |
| 4,536,380 | A | 8/1985 | Pirkle et al. | |
| 5,214,916 | A * | 6/1993 | Lukich | B60W 10/103 60/431 |
| 5,413,078 | A | 5/1995 | Mitsunaga et al. | |
| 5,647,317 | A * | 7/1997 | Weisman, II | B60K 31/045 123/299 |
| 5,855,533 | A * | 1/1999 | Tolkacz | B60W 10/06 477/110 |
| 6,133,643 | A * | 10/2000 | Lukich | F02D 31/007 290/40 A |
| 6,158,416 | A | 12/2000 | Chen et al. | |
| 6,286,480 | B1 * | 9/2001 | Chen | F02D 41/401 123/380 |
| 6,819,996 | B2 * | 11/2004 | Graves | B60W 10/04 123/352 |
| 6,837,225 | B1 | 1/2005 | Fukuda | |
| 7,035,729 | B2 * | 4/2006 | Prodi | F02D 37/02 123/339.19 |
| 7,047,730 | B2 * | 5/2006 | Wang | F01N 3/0885 60/274 |
| 7,246,605 | B2 | 7/2007 | Nazarov et al. | |
| 7,263,426 | B2 | 8/2007 | Withrow et al. | |
| 7,484,405 | B2 * | 2/2009 | Hazelton | F02D 41/2432 73/114.07 |
| 8,108,154 | B2 * | 1/2012 | Ramamurthy | F01N 3/2066 702/23 |
| 8,713,917 | B2 * | 5/2014 | Solbrig | F01N 3/208 60/286 |
| 8,783,030 | B2 * | 7/2014 | Chi | F02B 37/04 123/568.12 |
| 8,869,512 | B2 * | 10/2014 | Sujan | F02D 21/08 60/274 |
| 8,935,080 | B2 * | 1/2015 | Szwabowski | F02D 41/0002 123/196 S |
| 8,973,350 | B2 * | 3/2015 | Haseyama | F01N 3/02 60/295 |
| 9,127,614 | B2 * | 9/2015 | Ueno | F02D 41/30 |
| 9,440,193 | B2 * | 9/2016 | Iida | F01N 3/208 |
| 9,752,480 | B2 * | 9/2017 | Bergh | F01N 3/0842 |
| 9,828,925 | B2 * | 11/2017 | Slaton | F01N 11/00 |
| 10,012,158 | B2 * | 7/2018 | Kothandaraman | F02D 41/0077 |
| 2002/0121084 | A1 * | 9/2002 | Deeba | F01N 3/0814 60/298 |
| 2003/0145581 | A1 * | 8/2003 | Tashiro | F01N 3/035 60/286 |
| 2005/0130796 | A1 * | 6/2005 | Loeffler | B60K 6/48 477/4 |
| 2005/0252198 | A1 * | 11/2005 | Okugawa | F02D 41/0245 60/284 |
| 2006/0178800 | A1 * | 8/2006 | Chen | F02D 41/0097 701/105 |
| 2006/0201144 | A1 * | 9/2006 | Gabe | F01N 3/0231 60/299 |
| 2006/0218920 | A1 * | 10/2006 | Gokhale | F02D 35/023 60/601 |
| 2006/0236692 | A1 * | 10/2006 | Kolavennu | F01N 3/0807 60/602 |
| 2007/0062476 | A1 * | 3/2007 | Ota | F02B 23/104 123/179.4 |
| 2007/0074505 | A1 * | 4/2007 | Ogawa | F02D 41/0065 60/285 |
| 2008/0120962 | A1 * | 5/2008 | Okugawa | F01N 3/106 60/274 |
| 2008/0163610 | A1 * | 7/2008 | Baird | F01N 3/0842 60/295 |
| 2009/0076709 | A1 * | 3/2009 | Shiraishi | F02D 31/007 701/103 |
| 2009/0151693 | A1 * | 6/2009 | Ono | F02D 31/003 123/339.11 |
| 2009/0198429 | A1 * | 8/2009 | Farrell | F02D 13/0242 701/102 |
| 2010/0106343 | A1 | 4/2010 | Donnelly et al. | |
| 2010/0126142 | A1 * | 5/2010 | Murata | B60K 6/48 60/278 |
| 2010/0199640 | A1 * | 8/2010 | Kodo | F02D 41/0245 60/278 |
| 2010/0275582 | A1 * | 11/2010 | Wada | B01D 53/944 60/276 |
| 2011/0155109 | A1 * | 6/2011 | Onishi | F02D 35/026 123/568.11 |
| 2013/0008417 | A1 * | 1/2013 | Sankar | F02D 41/0047 123/568.12 |
| 2013/0024095 | A1 * | 1/2013 | Suzuki | F02D 41/1497 701/104 |
| 2013/0031891 | A1 * | 2/2013 | Ponnathpur | F01N 3/2066 60/274 |
| 2013/0131964 | A1 * | 5/2013 | Leroy | F02D 41/0002 701/105 |
| 2013/0139504 | A1 * | 6/2013 | Barasa | F02D 41/0245 60/605.1 |
| 2013/0204506 | A1 * | 8/2013 | Ertz | F02C 7/26 701/100 |
| 2013/0245920 | A1 * | 9/2013 | Vos | F02D 41/1443 701/104 |
| 2014/0013726 | A1 * | 1/2014 | Yacoub | F01N 3/32 60/274 |
| 2014/0216013 | A1 * | 8/2014 | Osaki | F01N 3/106 60/285 |
| 2014/0230433 | A1 * | 8/2014 | Yacoub | F01N 3/106 60/605.1 |
| 2015/0068506 | A1 * | 3/2015 | Gokhale | F02D 41/401 123/679 |
| 2015/0122225 | A1 * | 5/2015 | Kamada | F02D 41/1446 123/48 R |
| 2015/0190798 | A1 | 7/2015 | Patchett et al. | |
| 2015/0275773 | A1 * | 10/2015 | Huang | F02D 29/02 701/104 |
| 2015/0275792 | A1 * | 10/2015 | Genslak | F02D 41/0255 60/274 |
| 2016/0032850 | A1 * | 2/2016 | Sunley | F02D 41/0245 60/274 |
| 2016/0084181 | A1 * | 3/2016 | Henry | F02M 26/43 123/568.21 |
| 2017/0145938 | A1 * | 5/2017 | Kothandaraman | F02D 41/2416 |
| 2017/0184038 | A1 * | 6/2017 | Garrard | F02D 23/00 |
| 2017/0236341 | A1 * | 8/2017 | Walker | G07C 5/0808 701/34.4 |
| 2018/0003118 | A1 * | 1/2018 | zur Loye | F02D 41/0082 |
| 2018/0144388 | A1 * | 5/2018 | Mattern | G06Q 30/0631 |
| 2018/0163614 | A1 * | 6/2018 | Yerace | F02B 37/16 |

(56) References Cited

U.S. PATENT DOCUMENTS

2018/0216540 A1* 8/2018 Dupuis ................. F02D 41/024
2018/0223756 A1* 8/2018 Benson ................. F01N 3/0835
2019/0136738 A1* 5/2019 Morihiro ................. F01N 11/00

* cited by examiner

US 10,480,441 B2

SYSTEM AND METHOD FOR CONTROLLING EXHAUST GAS TEMPERATURE

BACKGROUND

Embodiments of the present invention generally relate to a system and method for controlling the temperature of exhaust gas. More particularly, but not exclusively, embodiments of the present invention relate to an engine system that is adapted to control the temperature of an exhaust gas by modifying an engine speed and outputted engine power relationship as a function of compressor inlet air density.

Selective catalytic reduction systems (SCR) typically are configured to provide one or more catalyst elements that, with the aid of a reductant, convert nitrogen oxides ($NO_x$) in exhaust gases into nitrogen ($N_2$) and water. The reductant may be injected into the exhaust gas upstream of an SCR catalyst. Typically, engine after-treatment systems attempt to inject a sufficient quantity of reductant into the exhaust gas stream necessary for the conversion of a predetermined amount of the $NO_x$ in the exhaust gas stream so as to prevent $NO_x$ slippage without incurring reductant slippage.

The efficiency of chemical reactions by an SCR catalyst may depend on a variety of different factors, including, for example, at least on the properties of the exhaust gas. For example, the efficiency of a catalyst of a selective catalytic reduction system (SCR) in reducing nitrogen oxides ($NO_x$) in an exhaust gas stream may depend, at least in part, on an inlet temperature and/or velocity of the exhaust gas steam that enters into the SCR. For example, FIG. 1 illustrates the conversion efficiency of an SCR in reducing $NO_x$ in an exhaust gas stream as a function of the inlet temperature of the exhaust gas stream entering into, received by, or at the catalyst of the SCR (SCR inlet exhaust gas temperature). As shown, in this example, the maximum $NO_x$ conversion efficiency, as a function of reaction kinetics such as temperature and space velocity, is attained when the SCR inlet temperature is from around 300 degrees Celsius to around 450 degrees Celsius. However, engine operations that experience low compressor inlet air density conditions, such as, for example, during high altitude and/or high temperature operating conditions, the SCR inlet exhaust gas temperature often exceeds the temperatures at which maximum $NO_x$ conversion efficiency may be attained by the SCR. As a consequence, under such operating conditions, the emissions released from the after-treatment system may exceed a target, or regulation specified, amount. Further, the relatively high SCR inlet exhaust gas temperatures that may be attained when engine operations experience low compressor inlet air density conditions may damage at least the SCR system.

BRIEF SUMMARY

An aspect of the present invention is a method that includes detecting an air density value upstream of an internal combustion engine of an engine system. The method further includes modifying a relationship between an engine speed and an outputted engine power as a function of the detected air density value. Further, using the modified relationship between an engine speed and an outputted engine power of the internal combustion engine, at least one of the engine speed and the outputted engine power is adjusted to attain a target exhaust gas temperature along at least a portion of an after-treatment system of the engine system.

Another aspect of the present invention is a method that includes determining an air density value for an inlet of an air compressor, the air compressor being positioned at an inlet side of an internal combustion engine of an engine system. The method further includes identifying, from two or more ranges of air density values, a range of air density values that encompasses the determined air density value. Further, using the identified range of air density values, an engine speed and engine power relationship is selected from a plurality of engine speed and engine power relationships. The selected engine speed and engine power relationship may correspond to an engine speed and an engine power that is to be achieved by operation of the internal combustion engine to attain a target exhaust gas temperature. A target exhaust gas temperature may also be attained by at least adjusting at least one of the engine speed and the engine power using information from the selected engine speed and engine power relationship.

A further aspect of the present invention is a method that includes determining an air-fuel ratio for an engine of an engine system. The method further includes identifying a relationship between an engine speed and an outputted engine power of the internal combustion engine as a function of the determined air-fuel ratio. Additionally, at least one of the engine speed and the outputted engine power may be adjusted using the modified relationship between the engine speed and the outputted engine power to attain a target exhaust gas temperature at an inlet of a selective catalytic reduction system of the engine system.

BRIEF DESCRIPTION OF THE DRAWINGS

The description herein makes reference to the accompanying figures wherein like reference numerals refer to like parts throughout the several views.

Figure 1:
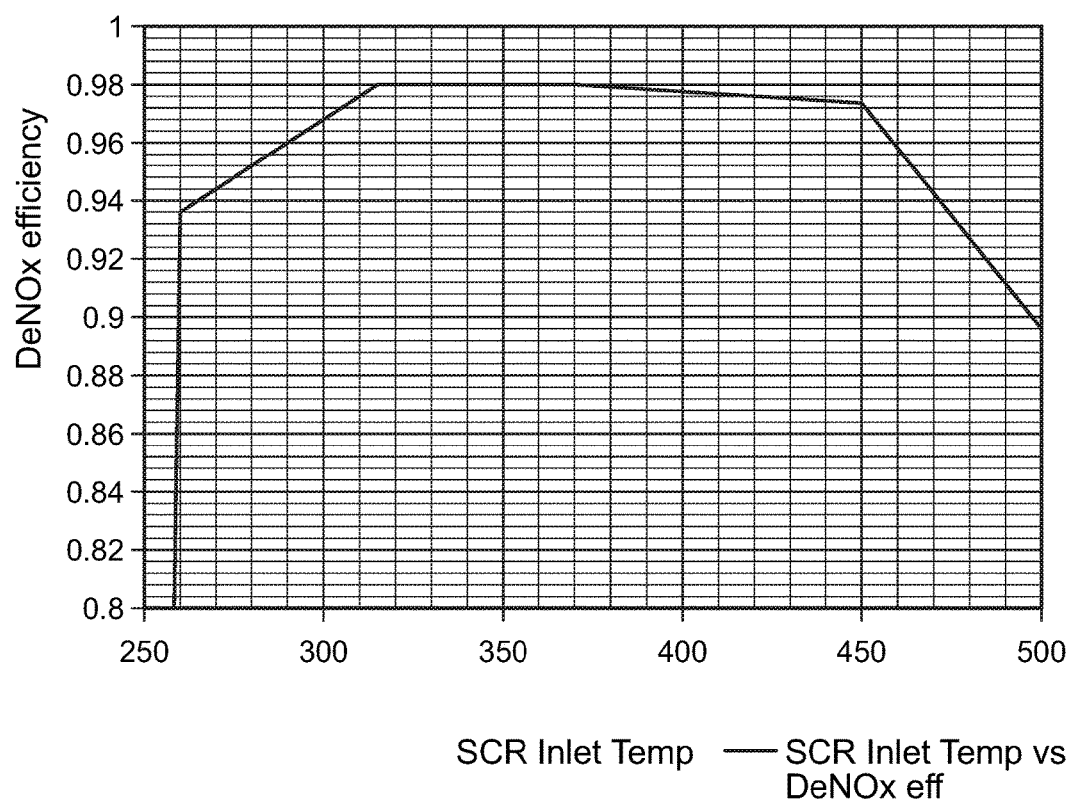
FIG. 1 illustrates an example of the conversion efficiency of a selective catalytic reduction system (SCR) in reducing $NO_x$ in an exhaust gas stream as a function of the inlet temperature of the exhaust gas stream entering into the SCR.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

The schematic flow descriptions which follow provide illustrative embodiments of performing procedures for controlling the temperature of an exhaust gas entering a selective catalytic reduction system (SCR) during at least situations in which the associated engine is operating at low compressor inlet air density conditions. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program on a computer readable medium, where the computer program comprises instructions causing the computer to execute one or more of the operations, or to issue commands to other devices to execute one or more of the operations.

Figure 2:
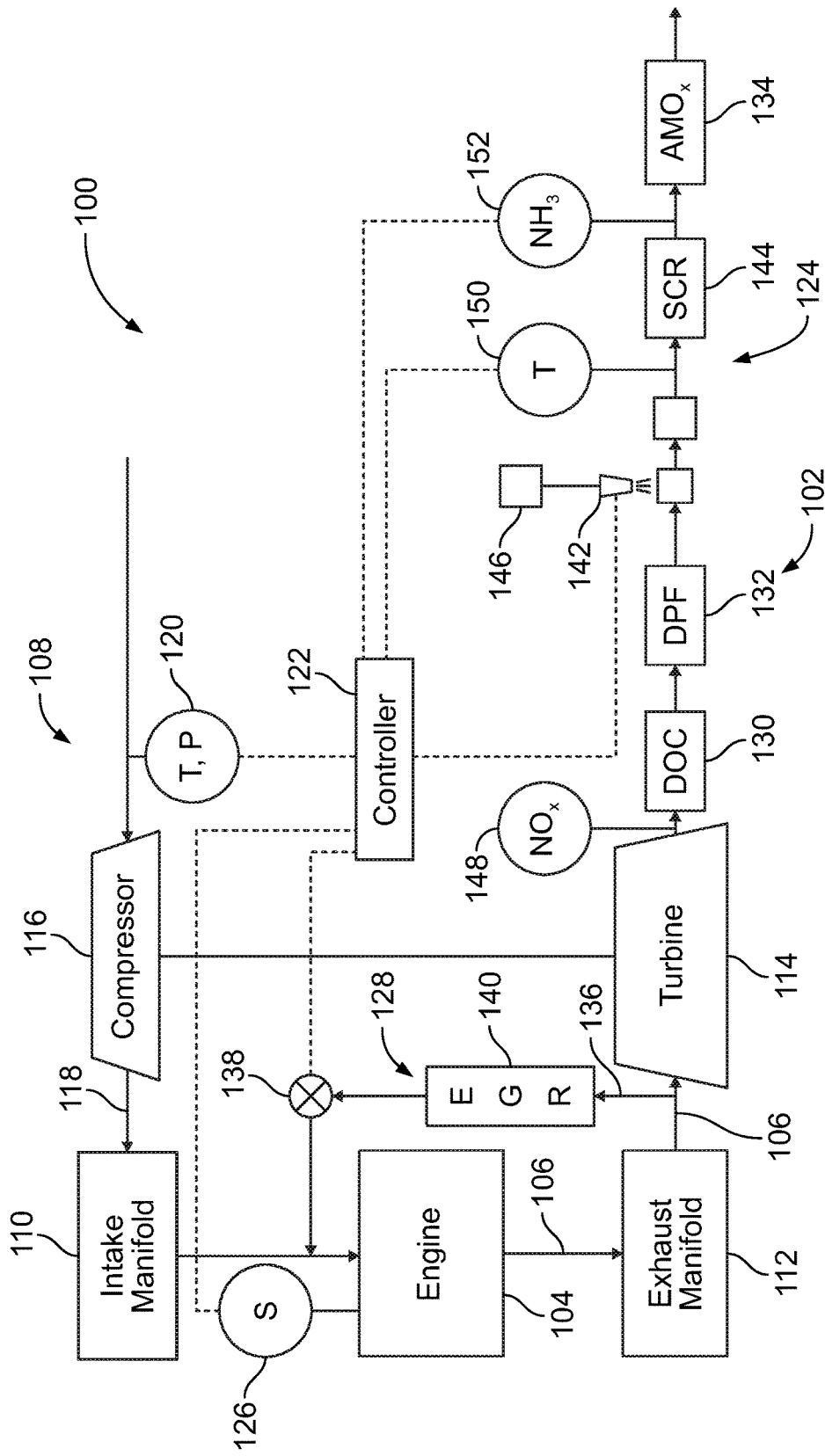
FIG. 2 illustrates a schematic block diagram of an exemplary engine system having an exhaust gas after-treatment system that may be configured to control the emissions of the engine system.

FIG. 2 illustrates a schematic block diagram of an exemplary engine system 100 having an exhaust gas after-treatment system 102, which may be configured to control the emissions of the engine system 100. The engine system 100 includes an engine 104, such as, for example, a combustion engine, including, but not limited to, a diesel, gasoline, natural gas, and/or combined fuel engine. Operation of the engine 104 generates an exhaust gas stream 106 that has an amount of nitrogen oxides ($NO_x$) as a constituent therein. Thus, the after-treatment system 102 may be configured to control the emission from the engine system 100 of $NO_x$ that may be generated by operation of the engine 104, as well as the emission of other pollutants, such as, for example, non-methane hydrocarbon emissions, carbon monoxide, and/or particulate matter.

The engine system 100 includes a turbocharger 108 that is in communication with an intake manifold 110 on an intake side of the engine 104, and in communication with an exhaust manifold 112 on an exhaust side of the engine 104. The turbocharger 108 may include a turbine 114 in fluid communication with the flow of at least a portion of the exhaust gas stream 106 that is exiting the exhaust manifold 112. Moreover, the turbine 114 may be disposed upstream of the after-treatment system 102 and be structured to convert at least a portion of the energy of the relatively hot and high pressure exhaust gas stream 106 into a torque.

The turbocharger 108 further includes a compressor 116 that is in fluid communication with the flow of charge gases 118 upstream of the intake manifold 110, and which is driven by the torque generated by the turbine 114. The compressor 116 may be structured to compress charge gases 118 and push an increased mass of charge gases 118 through the intake manifold 110 and into the cylinder(s) of the engine 104, which may thereby increase the power output of the engine 104. In at least one embodiment, the compressor 116 may be disposed upstream of an intake throttle (not shown). A variety of different turbochargers 108 may be utilized, including, but not be limited to, a multiple stage turbocharger, a variable geometry turbocharger (VGT), or a turbocharger having a wastegate or bypass valve. Additionally or alternatively, the engine system 100 may include a mechanically driven supercharger in communication with the intake manifold 110 and capable of pushing compressed charge gases 118 through the intake manifold 110 and into the engine 104. Other embodiments contemplate multiple turbochargers 108, as well as multiple compressors 116.

According to certain embodiments, the engine system 100 may include one or more intake sensors 120 that detect, monitor, or otherwise provide information for determining a density of air being that is being delivered to and/or received by the compressor 116, also referred to as a compressor inlet air density. For example, according to certain embodiments, the engine system 100 and/or compressor 116 may include an intake sensor 120 that is, or includes, a pressure sensor that provides information that indicates and/or is used to determine the compressor inlet air density. According to certain embodiments, the pressure sensor of the intake sensor 120 may sense a barometric pressure of the air that is being delivered to and/or received by the compressor 116. Further, according to certain embodiments, the intake sensor 120 may also include a temperature sensor that provides a temperature of the air being delivered and/or received by the compressor 116. Additionally, according to certain embodiments, information provided by the intake sensor 120 may be delivered to a controller 122 of the engine system 100, with the controller 122 being adapted to utilize information from the intake sensor 120 to determine the compressor inlet air density and/or to predict an intake side of the engine 104 air-fuel ratio.

According to the illustrated embodiment, the controller 122 is structured to functionally execute operations of the engine system 100, such as, for example, operations relating to a selective catalyst reduction system (SCR) 124. Further, the controller 122 may include a number of modules structured to functionally execute the operations of the controller 122. For example, an exemplary controller 122 includes a system conditions module, a $NO_x$ modeling module, a $NO_x$ reference module, a $NO_x$ error determination module, a $NO_x$ control module, and/or a doser control determination module. In certain embodiments, the controller 122 forms a portion of a processing subsystem including one or more computing devices having memory, processing, and communication hardware. The controller 122 may be a single device or a distributed device, and the functions of the controller 122 may be performed by hardware or software. In one form, the controller 122 is of a programmable variety that executes algorithms and processes data in accordance with operating logic that is defined by programming instructions (such as software or firmware). Alternatively or additionally, operating logic for the controller 122 may be at least partially defined by hardwired logic or other hardware.

According to certain embodiments, the engine system 100 may derive, monitor, and/or sense one or more operational characteristics relating to engine speed and/or engine torque. For example, the engine system 100 may include an engine speed sensor 126 that may sense a speed of an engine 104 and which is in communication with the controller 122. The engine speed sensor 126 may take a variety of different forms, including, for example, be a crank sensor that monitors the rotational speed and/or position of a crankshaft of the engine 104. Additionally, the engine system 100 may be adapted to determine the power outputted by the engine, such as, for example, the torque or electrical current generated via operation of the engine 104, among other forms of outputted power. For example, according to certain embodiments, the controller 122 may be adapted to determine the power outputted by the engine 104 using one or more operating conditions, performance of, or demands on the engine 104, including, but not limited to, engine speed, intake air pressure, intake air mass, spark timing angle, throttle position, and air-fuel ratio, along with associated algorithms and/or look-up tables.

The after-treatment system 102 may include one or more after-treatment devices. For example, according to certain embodiments, the after-treatment system 102 may include, but is not limited to, an exhaust gas recirculation system (EGR) 128, a oxidation catalyst (DOC) 130, a particulate filter 132, such as, for example, a diesel particulate filter (DPF), and/or one or more ammonia oxidation catalysts (AMOx) 134. As shown in FIG. 2, according to certain embodiments, the EGR 128 may include an exhaust flow path 136, an EGR valve 138, and an EGR cooler 140. According to such an embodiment, the EGR 128 may be configured to recirculate at least a portion of the exhaust gas stream 106, which may be cooled by the EGR cooler 140, to an intake side of the engine 104.

According to certain embodiments, the SCR 124 includes a reductant injector or doser 142 and one or more SCR catalyst components 144. The reductant doser 144 is in fluid communication with a reductant source 146, and is controllable by a controller 122. The reductant source 146 may contain a reductant, such as, for example, ammonia ($NH_3$), urea, and/or a hydrocarbon, that is supplied for injection by the reductant doser 144 into the exhaust gas stream 106 at a position upstream of the SCR catalyst component 144. The controller 122 may be configured to both determine a ratio of reductant to $NO_x$ in the exhaust gas stream 106, such as, for example, an ammonia to $NO_x$ ratio (ANR) during operation of the engine 104, and to adjust the operation of the reductant doser 142 to achieve a target reductant to $NO_x$ ratio.

The one or more SCR catalyst components 144 are configured to provide an SCR catalyst that at least assists in the reductant reacting with $NO_x$ in the exhaust gas to reduce the amount of $NO_x$ in the exhaust gas stream 106. According to certain embodiments, the SCR catalyst component 144 may include a housing having one or more channels for the flow of divided portions of the exhaust gas stream 106. Additionally, one or more SCR catalysts may be positioned within the channels of the SCR catalyst component 144. Further, the SCR 124 may include a plurality of SCR catalyst components 144, such as, for example but not limited to, a single SCR catalyst component 144 as shown in FIG. 2, or first and second SCR catalyst components.

According to certain embodiments, the after-treatment system 102 may include at least one engine-out $NO_x$ sensor 148 that is used in detecting an $NO_x$ level in the exhaust gas stream 106 upstream of the SCR 124. In the illustrated embodiment, one or more of the engine-out $NO_x$ sensors 148 may be positioned upstream of the DOC 130, the DPF 132, and/or the reductant doser 142. Further, according to the illustrated embodiment, the engine-out $NO_x$ sensor 148 may provide a signal for the controller 122 that indicates, and/or is used in determining, a level of $NO_x$ in the exhaust gas at a location upstream of the reductant doser 142. Alternatively, the quantity of engine-out $NO_x$ may be modeled, calculated from an engine operation map, and/or measured from a different location than the location of the engine-out $NO_x$ sensors 148 shown in FIG. 1.

The after-treatment system 102 may also include at least one temperature sensor 150 that is in communication with the controller 122. The temperature sensor(s) 150 may be any suitable device, including but not limited to a thermocouple, thermistor, and pyrometer. Further, the SCR inlet exhaust gas temperature and/or the temperature of the SCR catalyst component 144 may be determined in a variety of different manners, including, for example, at least by utilizing a weighted average of temperature sensors 150 that are positioned upstream and downstream of the SCR catalyst component 144, or modeling and/or estimating the temperature of the SCR catalyst component 144 based upon other temperature measurements available in the engine system 100, and more specifically within the after-treatment system 102.

According to certain embodiments, the temperature sensor 150 may be used to determine an inlet temperature of exhaust gas in the exhaust gas stream, such as, for example, the temperature of exhaust gas in the exhaust gas stream 106 that is upstream of the SCR 124, at or around an inlet of the SCR 124, and/or is positioned to detect the temperature of one or more SCR catalyst components 144 of the SCR 124. Further, one or more temperature sensors 150 may be positioned downstream of the SCR catalyst component 144. Additionally, according to certain embodiments, the after-treatment system 102 may further include an ammonia ($NH_3$) sensor 152, which may detect a level(s) of ammonia present in exhaust gas that is being exhausted or otherwise released from the engine system 100.

As discussed below, according to certain embodiments, the engine system 100 may be adapted to modulate the relationship between engine speed and engine output or power as a function of the compressor inlet air density and/or air-fuel ratio to maintain the SCR inlet exhaust gas temperature at about or within a predetermined temperature range. Such an embodiment may control the SCR inlet exhaust gas temperature such that the SCR inlet exhaust gas temperature is maintained at or around a temperature or range of temperatures that may accommodate optimum SCR kinetics and $NO_x$ conversion efficiency. For example, according to certain embodiments, the engine system 100 may be adapted to modulate the relationship between engine speed and power outputted by operation of the engine as a function of compressor inlet air density and/or the air-fuel ratio to maintain the SCR inlet exhaust gas temperature between around 300 degrees Celsius to around 450 degrees Celsius. Additionally, such a process may be adapted to maintain the SCR inlet exhaust gas temperature below temperatures that could damage the SCR 124. For example, according to certain embodiments, the engine system 100 may be adapted to modify the relationship between engine speed and engine output or torque as a function of the compressor inlet air density and/or the corresponding predicted air-fuel ratio to at least assist in maintaining the SCR inlet exhaust gas temperature below 525 degrees Celsius.

Operation of the engine system 100 in such manners may provide an alternative to prior attempts that sought to attain target engine out $NO_x$ levels at lower compressor inlet air density by using in-cylinder $NO_x$ reduction approaches, such as, for example, timing retardation and lowering of fuel injection pressures. Accordingly, by utilizing in which the SCR 124 continues to operate at relatively optimal conditions during low compressor inlet air density conditions, and which does not involve in-cylinder $NO_x$ reduction, embodiments of the present invention may provide improved diesel exhaust fluid, diesel fuel, or overall fluid consumption improvement. Additionally, modification of the engine speed and power relationship in relation to compressor inlet air density may improve engine combustion performance by alternating charge density/oxygen content in the cylinder(s) of the engine 104, which may improve performance of the engine 104 and/or the after-treatment system 102.

Figure 3:
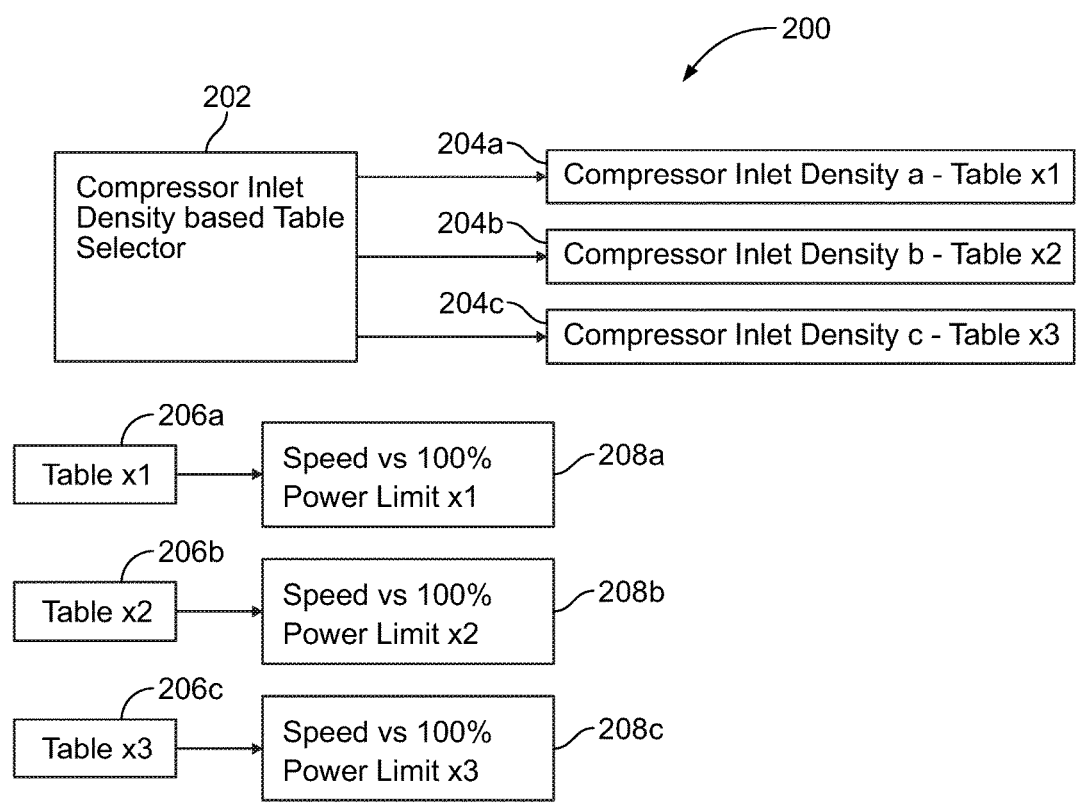
FIG. 3 illustrates a schematic block diagram of a system in which a decrease in an air-fuel ratio is compensated by an adjustment in engine speed and/or engine power, and wherein such compensation is proportional to a compressor inlet air density.

FIG. 3 illustrates a block diagram of a control system 200 in which a decrease in an air-fuel ratio, such as that attributed to low air density conditions, is compensated by an increase in engine speed and engine power, and wherein such compensation is proportional to a compressor inlet air density. For example, according to certain embodiments, the compressor inlet air density as detected and/or measured through the use of the one or more intake sensors 120 may be provided to a table selector 202 of the controller 122. The table selector 202 may determine whether the measured or detected compressor inlet air density is, or is not, within two or more range of values. For example, according to the embodiment depicted in FIG. 3, the table selector 202 may determine whether the measured or detected compressor inlet air density falls within three ranges 204a-c of compressor inlet air densities, as indicated by "Density a," "Density b," and "Density c" in FIG. 3. Each of the ranges 204a-c of measured or detected compressor inlet air densities may be associated with one or more algorithms and/or look-up tables 206a-c (e.g., Table x1, Table x2, and Table x3). Such algorithms and/or look-up tables 206a-c may provide power information or values 208a-c regarding the maximum power, referred to as "100% Power Limit" in FIG. 3, that may be used or attained by adjustments in the speed and/or power outputted by the engine 104 when the compressor inlet air density is at the measured or detected level in order to achieve a selected SCR inlet temperature or range of temperatures. For example, the power information or values 208a-c may indicate that, at a given compressor inlet air density, a power level or range that is to be attained by the engine 104 at a particular, or range, of engine speed(s) if the SCR inlet exhaust gas temperature is to reach a temperature level or range that may facilitate maximum $NO_x$ conversion efficiency.

A variety of different types of powers may be utilized for the power information or values 208a-c. For example, according to certain embodiments, the power information or values 208a-c provided by the algorithms and/or look-up tables may correspond to engine torque. According to such embodiments, the power information or values 208a-c provided by the algorithms and/or look-up tables may indicate the maximum torque that may be provided by the engine 104 and the corresponding engine speed in order to attain a particular SCR inlet exhaust gas temperature and/or to be within a particular range of SCR inlet exhaust gas temperatures. According to other embodiments, the power information or values 208a-c provided by the algorithms and/or look-up tables may provide an indication of a maximum system current and/or voltage level that may be attained by operation of the engine 104 and the corresponding engine speed in order to attain a particular SCR inlet exhaust gas temperature and/or to be within a particular range of SCR inlet exhaust gas temperatures.

Figure 4A:
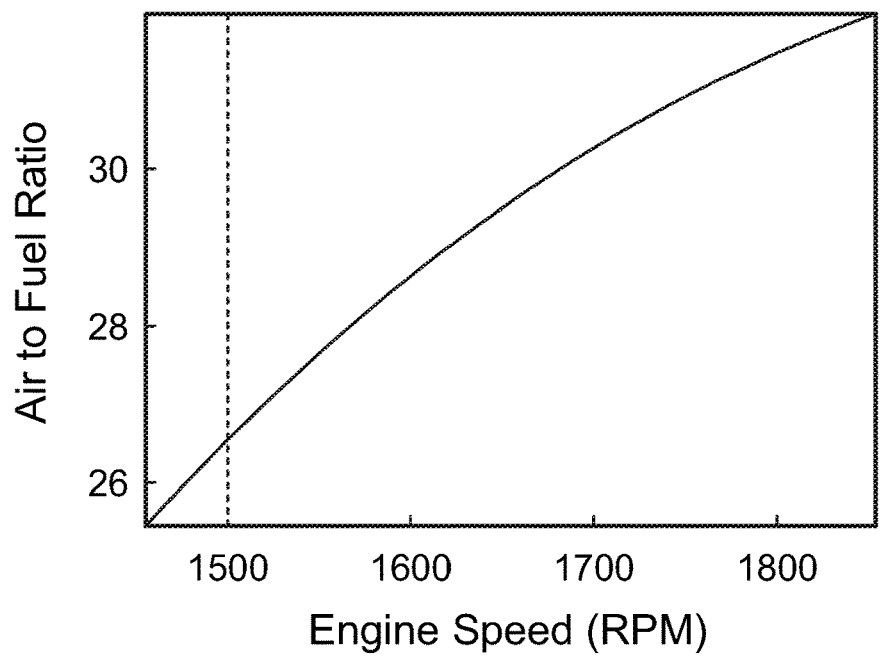
FIGS. 4A and 4B illustrate graphs depicting a determination of the air-fuel ratio for an engine operating at an engine speed of 1500 revolutions per minute and which is outputting a power of 4000 horsepower.
Figure 4B:
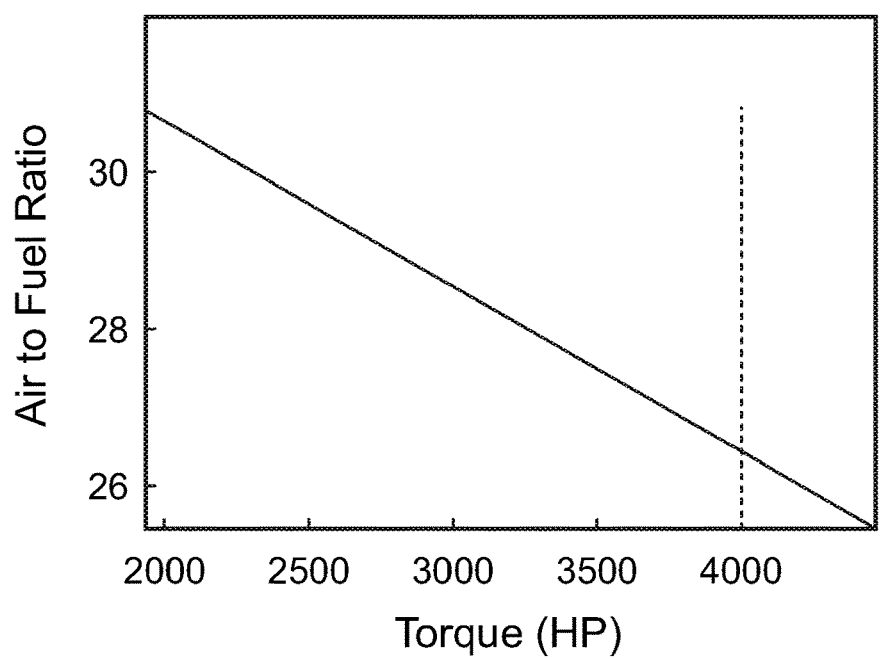
Figure 4C:
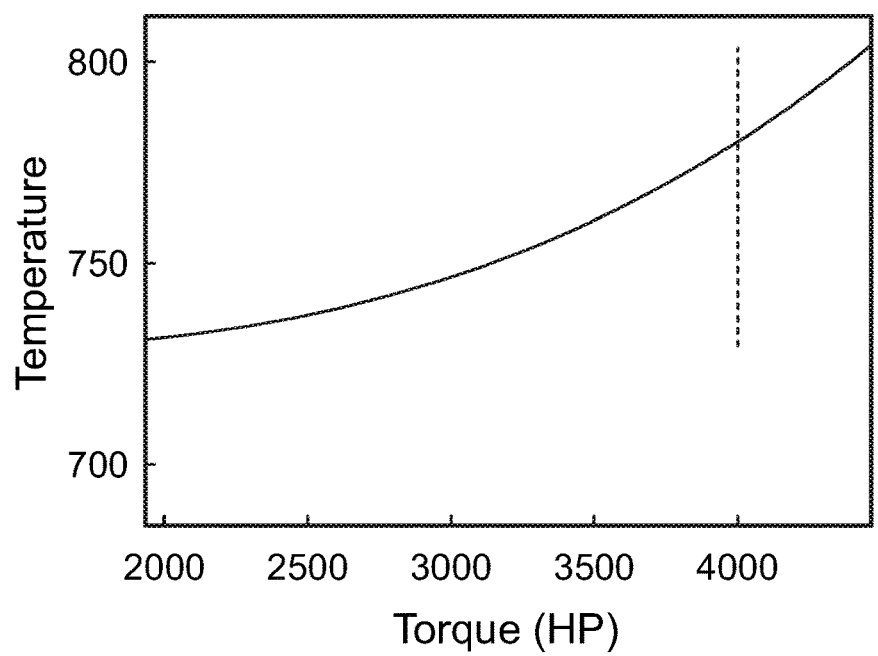
FIGS. 4C and 4D illustrate graphs depicting SCR inlet temperature as a function of engine speed and outputted torque, respectively, for the air-fuel ratio shown in FIGS. 4A and 4B.
Figure 4D:
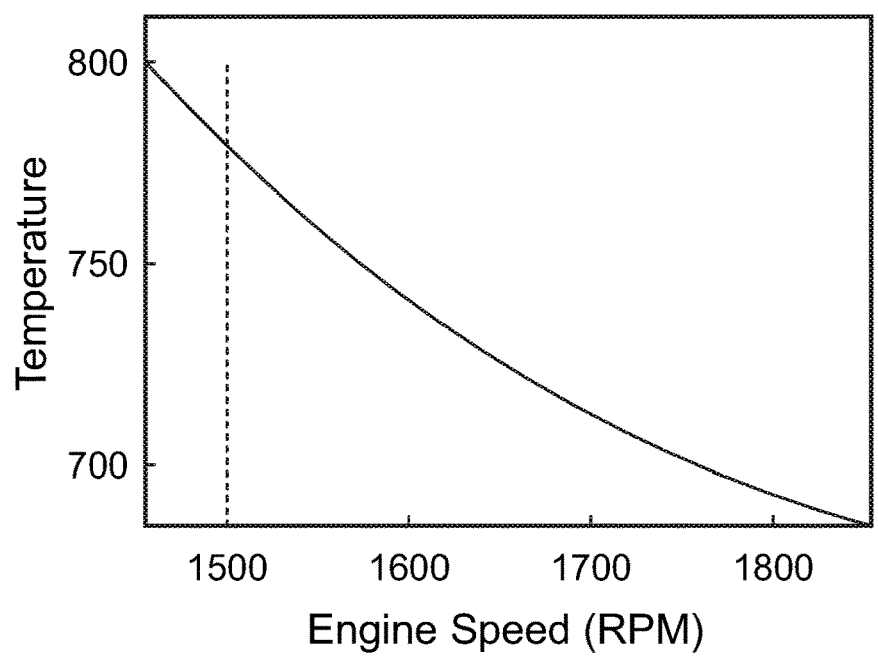
Figure 5A:
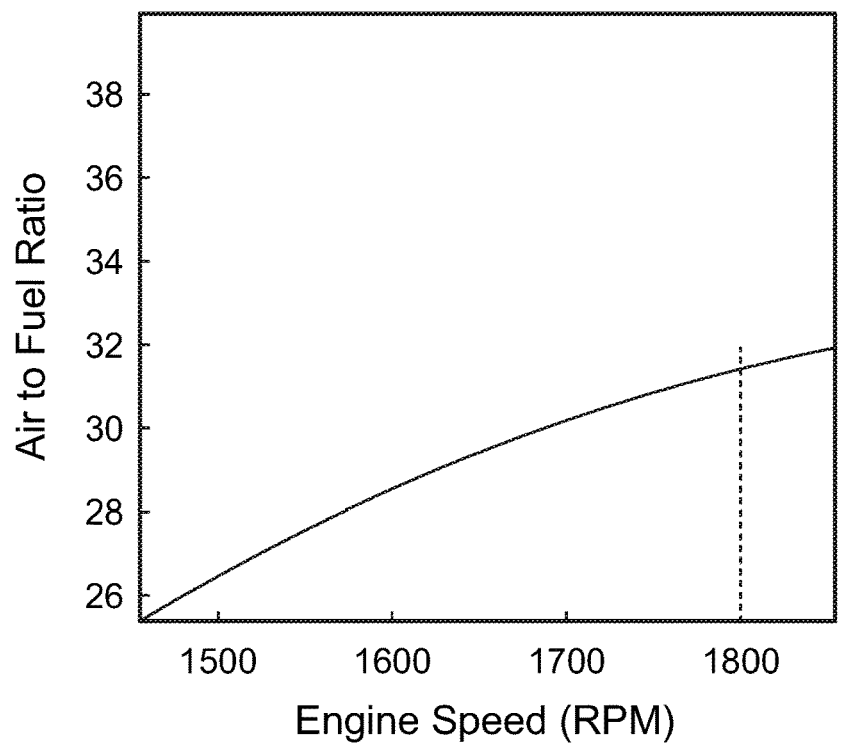
FIGS. 5A and 5B illustrate graphs depicting a determination of the air-fuel ratio for an engine operating at an engine speed of 1800 revolutions per minute and which is outputting a power of 4000 horsepower.
Figure 5B:
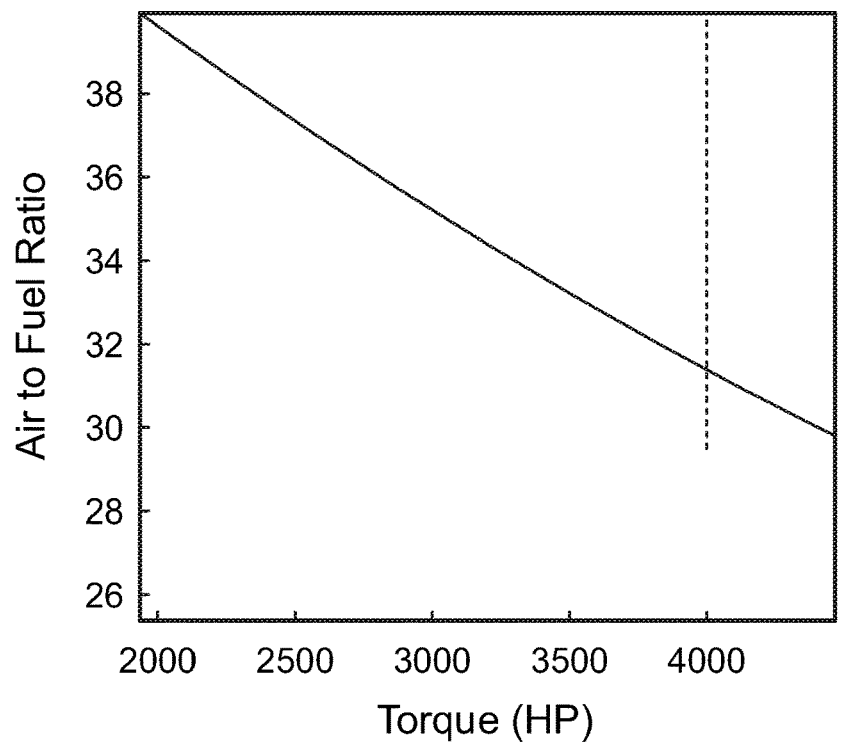
Figure 5C:
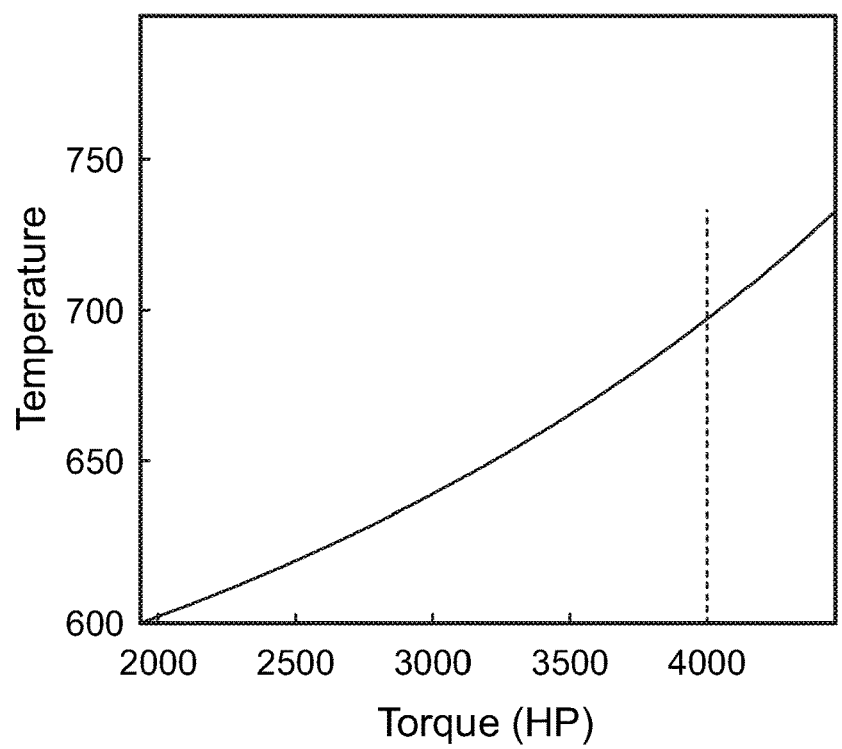
FIGS. 5C and 5D illustrate graphs depicting SCR inlet temperature as a function of engine speed and outputted torque, respectively, for the air-fuel ratio shown in FIGS. 5A and 5B.
Figure 5D:
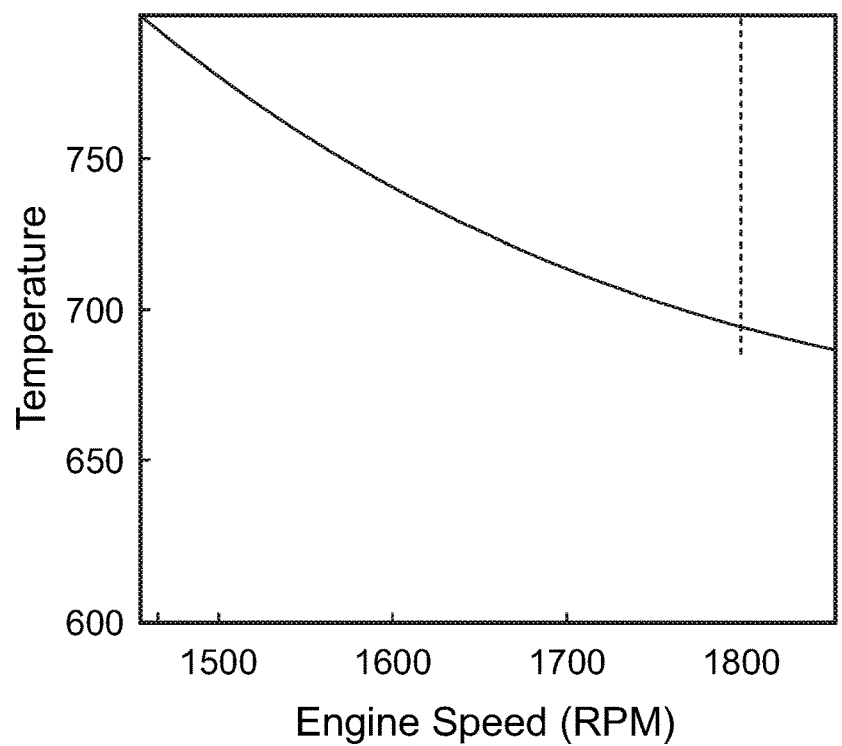

The parameters for the engine speed and outputted power relationship as a function of compressor inlet density, as used by the system 200 depicted in FIG. 3, may be attained in a variety of different manners. For example, according to certain embodiments, such parameters and/or relationships may be attained and/or optimized by engine bench testing. For example, FIGS. 4A and 4B illustrate air-fuel ratio for an engine 104 as a function of toque and speed, respectively. Moreover, FIGS. 4A and 4B illustrate an air-fuel ratio of approximately 26.5 for an engine that is operating at about 1500 revolutions per minute (RPM) and is outputting power in the form of a torque of about 4000 horsepower (HP), with the start of injection (SOI) being 8 degrees before top dead center (TDC), a rail pressure of 2150 bar, and a WG position of 0%. Referencing FIGS. 4C and 4D, under such operating conditions, the resulting exhaust gas that has been outputted from the engine 104 may, when or prior to being delivered to the SCR 124, may have an SCR inlet exhaust gas temperature of approximately 778 degrees Fahrenheit (414 degrees Celsius). FIGS. 5A-5D illustrate similar operating conditions, including an engine torque of about 4000 horsepower (HP), but in which the engine speed has been increased to 1800 revolutions per minute (RPM). As indicated by FIGS. 5A and 5B, at an engine speed of 1800 RPMS, the air-fuel ratio is approximately 31.5. Further, as shown in FIGS. 5C and 5D, with the engine speed increased to 1800 RPMS, the SCR inlet exhaust gas temperature was detected as being approximately 693 degrees Fahrenheit (367 degrees Celsius). Thus, when compared to the results of the engine 104 that was operated at 1500 RPMS, an approximately 18% increase in engine speed to 1800 RPM resulted in about a 21% increase in the air-fuel ratio. Such an increase in the air-fuel ratio accommodated a reduction in the SCR inlet exhaust gas temperature from around 778 degrees Fahrenheit (414 degrees Celsius), to a temperature of around 693 degrees Fahrenheit (367 degrees Celsius).

In the present example, such a reduction in SCR inlet exhaust gas temperature may place the SCR inlet exhaust gas temperature within a temperature range that may improve SCR kinetics (temperature and space velocity) as well as facilitate attaining maximum $NO_x$ conversion efficiency, as indicated by the chart in FIG. 1. Further, as indicated by at least FIG. 3 and discussed above, similar parameters relating to the engine speed and power relationship as a function of compressor inlet density may be attained for a variety of other compressor inlet densities, or ranges of densities. Additionally, again, according to certain embodiments, selection of values, such as, for example, via use of one or more control algorithms, for at least the engine speed and torque relationship as a function of compressor inlet density, and the associated SCR inlet temperature, may be optimized via engine testing.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method comprising:
    detecting an air density value upstream of an internal combustion engine of an engine system;
    modifying a relationship between an engine speed and an outputted engine power as a function of the detected air density value; and
    adjusting, using the modified relationship between an engine speed and an outputted engine power of the internal combustion engine, at least one of the engine speed and the outputted engine power to attain a target exhaust gas temperature along at least a portion of an after-treatment system of the engine system.

2. The method of claim 1, wherein the air density value is detected at an inlet of a compressor, and wherein the target exhaust gas temperature is a target temperature for an exhaust gas at an inlet of a selective catalytic reduction system of the after-treatment system.

3. The method of claim 2, wherein the target temperature is between around 300 degrees Celsius to around 450 degrees Celsius.

4. The method of claim 3, wherein the step of adjusting at least one of the engine speed and the outputted engine power comprises adjusting the engine speed of the internal combustion engine while maintaining the outputted engine power.

5. The method of claim 3, wherein the step of adjusting at least one of the engine speed and the outputted engine power comprises adjusting the outputted engine power while maintaining the engine speed.

6. The method of claim 5, wherein the step of adjusting the outputted engine power comprises adjusting a torque outputted by operation of the internal combustion engine.

7. The method of claim 5, wherein the step of adjusting the outputted engine power comprises adjusting at least one of a current level and a voltage level outputted by operation of the internal combustion engine.

8. The method of claim 2, wherein the target temperature is a temperature that protects the after-treatment system from damage due to excessive exhaust gas temperature, and further wherein the target temperature does not exceed 525 degrees Celsius.

9. A method comprising:
    determining an air density value for an inlet of an air compressor, the air compressor positioned at an inlet side of an internal combustion engine of an engine system;
    identifying, from two or more ranges of air density values, a range of air density values that encompasses the determined air density value;
    selecting, using the identified range of air density values, an engine speed and engine power relationship from a plurality of engine speed and engine power relationships, the selected engine speed and engine power relationship corresponding to an engine speed and an engine power to be achieved by operation of the internal combustion engine to attain a target exhaust gas temperature; and
    attaining the target exhaust gas temperature by at least adjusting at least one of the engine speed and the engine power using information from the selected engine speed and engine power relationship.

10. The method of claim 9, wherein the step of attaining the target exhaust gas temperature does not include reducing a target engine out nitrogen oxide level by timing retardation or lowering of fuel injection pressures.

11. The method of claim 9, wherein the target exhaust gas temperature is a target temperature of an exhaust gas at an inlet of a selective catalytic reduction system of the engine system.

12. The method of claim 11, wherein the target temperature is between around 300 degrees Celsius to around 450 degrees Celsius.

13. The method of claim 11, wherein the step of attaining the target exhaust gas temperature by at least adjusting at least one of the engine speed and the engine power comprises adjusting the engine speed while maintaining the engine power.

14. The method of claim 3, wherein the step of attaining the target exhaust gas temperature by at least adjusting at least one of the engine speed and the engine power comprises adjusting the engine power while maintaining the engine speed, and wherein the adjusted engine power comprises at least one of the following, a torque, a current level, and a voltage level outputted by operation of the internal combustion engine.

15. The method of claim 9, wherein the target exhaust gas temperature is a temperature that protects an after-treatment system from damage due to excessive exhaust gas temperatures, and further wherein the target exhaust gas temperature does not exceed 525 degrees Celsius.

16. A method comprising:
    determining an air-fuel ratio for an engine of an engine system;
    modifying a relationship between an engine speed and an outputted engine power as a function of the determined air-fuel ratio; and
    adjusting at least one of the engine speed and the outputted engine power using the modified relationship between the engine speed and the outputted engine power to attain a target exhaust gas temperature at an inlet of a selective catalytic reduction system of the engine system.

17. The method of claim 16, further including the step of determining the air-fuel ratio includes determining an air density value at an inlet of a compressor positioned upstream of the engine, and wherein the air-fuel ratio is determined, at least in part, using the detected air density value.

18. The method of claim 17, wherein the target exhaust gas temperature is between around 300 degrees Celsius to around 450 degrees Celsius.

19. The method of claim 18, wherein the step of adjusting at least one of the engine speed and the outputted engine power comprises adjusting the engine speed while maintaining the outputted engine power.

20. The method of claim 17, wherein the adjusted outputted engine power comprises at least one of the following, a torque, a current level, and a voltage level outputted by operation of the internal combustion engine.

* * * * *